(12) United States Patent
Liu et al.

(10) Patent No.: US 8,787,437 B2
(45) Date of Patent: Jul. 22, 2014

(54) ADAPTIVE EQUALIZER AND METHOD THEREOF

(75) Inventors: Ling Liu, Beijing (CN); Zhenning Tao, Beijing (CN); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1126 days.

(21) Appl. No.: 12/479,268

(22) Filed: Jun. 5, 2009

(65) Prior Publication Data

US 2009/0304064 A1    Dec. 10, 2009

(30) Foreign Application Priority Data

Jun. 6, 2008   (CN) .......................... 2008 1 0108922

(51) Int. Cl.
*H03H 7/30*   (2006.01)

(52) U.S. Cl.
USPC ........... 375/232; 342/151; 375/229; 375/233; 375/234; 381/103

(58) Field of Classification Search
None
See application file for complete search history.

(56) References Cited

U.S. PATENT DOCUMENTS

| | | | |
|---|---|---|---|
| 7,583,729 B2 * | 9/2009 | Liu et al. ....................... | 375/232 |
| 2007/0206670 A1 * | 9/2007 | Aziz ............................. | 375/233 |

FOREIGN PATENT DOCUMENTS

| | | |
|---|---|---|
| JP | 2003-281831 | 10/2003 |
| JP | 2005-510182 | 4/2005 |
| WO | 2008-038337 | 4/2008 |

OTHER PUBLICATIONS

Japanese Office Action mailed Jun. 4, 2013 in corresponding Japanese Application No. 2009-137083.
Japanese Office Action mailed Aug. 13, 2013 in corresponding Japanese Application No. 2009-137083.

* cited by examiner

*Primary Examiner* — Adolf Dsouza
(74) *Attorney, Agent, or Firm* — Staas & Halsey LLP

(57) ABSTRACT

An adaptive equalizer and an adaptive equalizing method are provided. The adaptive equalizer includes an adaptive equalizing unit, for adaptively equalizing an inputted signal to output the equalized signal; a coefficient updating unit, for updating a coefficient of a filter of the adaptive equalizing unit; a switching unit, connected between the coefficient updating unit and the adaptive equalizing unit and a monitoring device, for controlling on or off of the switching unit in accordance with the fact that a down sampling phase of the inputted signal or a down sampling phase of the equalized signal is within a predetermined range. When the switching unit is on, the coefficient updating unit is capable of updating the coefficient of the adaptive equalizing unit, and when the switching unit is off, the coefficient updating unit is incapable of updating the coefficient of the adaptive equalizing unit.

9 Claims, 6 Drawing Sheets

ADAPTIVE EQUALIZER AND METHOD THEREOF

FIELD OF THE INVENTION

The present invention relates to communications. The present invention relates to an adaptive equalizer under an asynchronous clock.

BACKGROUND OF THE RELATED ARTS

The adaptive equalizer can effectively track a time-varying input signal in an unknown environment to correct in real time the spectral aberration of the received signal, so as to achieve the objectives of removing crosstalk among symbols in the time domain and realizing positive decision. FIG. 1 is a structural block diagram showing a prior art adaptive equalizer. As shown in FIG. 1, an analog input signal 101 passes through an analog-to-digital converter 103 controlled by a clock signal 102 to obtain a quantized digital signal 104 for subsequent equalizing process. A coefficient updating unit 107 obtains an updated equalizer coefficient in accordance with the input digital signal 104 and an output signal 106 of an adaptive equalizing unit 105, and inputs the coefficient to the adaptive equalizing unit 105 to make possible real-time tracking of changes in the system. It is usually required that frequency of the clock signal 102 be an integral multiple of the signal code rate, that is to say, a synchronous clock should be used. However, due to such severe system damages in the communications system as inter-code crosstalk, chromatic dispersion and polarization mode dispersion, there is great difficulty in extracting clock information.

SUMMARY OF THE INVENTION

The present invention is proposed in view of the above problems existent in the prior art. A method is provided for achieving adaptive equalization under an asynchronous clock.

To achieve the above objectives, the present application provides the following aspects.

Aspect 1: An adaptive equalizer includes an adaptive equalizing unit, for adaptively equalizing an inputted signal to output the equalized signal; a coefficient updating unit, for updating a coefficient of a filter of the adaptive equalizing unit; a switching unit, connected between the coefficient updating unit and the adaptive equalizing unit, wherein when the switching unit is on, the coefficient updating unit is capable of updating the coefficient of the adaptive equalizing unit, and when the switching unit is off, the coefficient updating unit is incapable of updating the coefficient of the adaptive equalizing unit; and a monitoring device, for controlling on or off of the switching unit in accordance with a down sampling phase of the inputted signal or a down sampling phase of the equalized signal.

Aspect 2: The adaptive equalizer according to aspect 1, characterized in that the monitoring device includes a phase detecting unit, for detecting the down sampling phase of the inputted signal or the down sampling phase of the equalized signal; a determining unit, for determining whether the phase detected by the phase detecting unit is within a predetermined range; and a controlling unit, for controlling on and off of the switching unit in accordance with the determination result of the determining unit.

Aspect 3: The adaptive equalizer according to aspect 2, characterized in that the phase detecting unit calculates the down sampling phase of the inputted signal or the down sampling phase of the equalized signal at an interval of N samples, and the determining unit determines whether the phase is within a predetermined range, wherein N is a positive integer greater than or equal to 1.

Aspect 4: The adaptive equalizer according to aspect 2, characterized in that the phase detecting unit calculates, with respect to the inputted signal of the current sample or the equalized signal of the current sample, the down sampling phase of the inputted signal or the down sampling phase of the equalized signal of the current sample as well as the down sampling phase of the inputted signal or the down sampling phase of the equalized signal of the previous sample and the next sample which are spaced by a half symbol period from the current sample, and the determining unit determines whether the down-sampling phase of the inputted signal or the equalized signal of the current sample is within the predetermined range in accordance with the down sampling phase of the inputted signal or the equalized signal of the current sample and the down sampling phase of the inputted signal or the equalized signal of the previous sample and the next sample which are spaced by a half symbol period from the current sample.

Aspect 5: The adaptive equalizer according to aspect 4, characterized in that, with respect to a predetermined positive threshold value thres, the determining unit determines whether the following conditions are concurrently satisfied:

$e(k_-) \leftarrow thres$, $e(k) > thres$, and $e(k_+) \leftarrow thres$, if the above conditions are concurrently satisfied, the determining unit determines that the down sampling phase of the inputted signal or the down sampling phase of the equalized signal of the current sample is within the predetermined range, where $e(k_-)$ indicates the down sampling phase of the inputted signal or the down sampling phase of the equalized signal of the previous sample spaced by a half symbol period from the current sample, $e(k)$ indicates the down sampling phase of the inputted signal or the down sampling phase of the equalized signal of the current sample, and $e(k_+)$ indicates the down sampling phase of the inputted signal or the down sampling phase of the equalized signal of the next sample spaced by a half symbol period from the current sample.

Aspect 6: The adaptive equalizer according to aspect 4, characterized in that, with respect to a predetermined positive threshold value thres, the determining unit determines whether the following conditions are concurrently satisfied:

$e(k_-) > thres$, $e(k) \leftarrow thres$, and $e(k_+) > thres$, if the above conditions are concurrently satisfied, the determining unit determines that the down sampling phase of the inputted signal or the down sampling phase of the equalized signal of the current sample is within the predetermined range, where $e(k_-)$ indicates the down sampling phase of the inputted signal or the down sampling phase of the equalized signal of the previous sample spaced by a half symbol period from the current sample, $e(k)$ indicates the down sampling phase of the inputted signal or the down sampling, phase of the equalized signal of the current sample, and $e(k_+)$ indicates the down sampling phase of the inputted signal or the down sampling phase of the equalized signal of the next sample spaced by a half symbol period from the current sample.

Aspect 7: The adaptive equalizer according to aspect 2, characterized in that the down sampling phase of the inputted signal or the down sampling phase of the equalized signal is indicated by a timing error or power of the inputted signal or the equalized signal.

Aspect 8: The adaptive equalizer according to aspect 1, characterized in further including one or more other adaptive equalizing units, for adaptively equalizing respective inputted signals to output the equalized signals; one or more other coefficient updating units, corresponding to the one or more other adaptive equalizing units on a one-by-one basis, for updating coefficients of filters of the corresponding other adaptive equalizing units; one or more other switching units, respectively connected between the other coefficient updating units and the other adaptive equalizing units corresponding to the other coefficient updating units, wherein when the switching units are on, the other coefficient updating units are capable of updating the coefficients of filters of the adaptive equalizing units, and when the switching units are off, the other coefficient updating units are incapable of updating the coefficients of filters of the adaptive equalizing units; the monitoring device controls update of the coefficients of the filters of the other adaptive equalizing units besides the adaptive equalizing unit in further accordance with the down sampling phase of the inputted signal of the adaptive equalizing unit or the down sampling phase of the equalized signal of the adaptive equalizing unit.

Aspect 9: An adaptive equalizer includes a plurality of adaptive equalizing units, for adaptively equalizing respective inputted signals to output the equalized signals; a plurality of coefficient updating units, corresponding to the plurality of adaptive equalizing units, for updating coefficients of filters of the corresponding adaptive equalizing units; a plurality of switching units, respectively connected between the coefficient updating units and the adaptive equalizing units to which the coefficient updating units correspond, wherein when the switching units are on, the coefficient updating units are capable of updating the coefficients of the adaptive equalizing units, and when the switching units are off, the coefficient updating units are incapable of updating the coefficients of the adaptive equalizing units; and a monitoring device, for controlling on or off of one or more of the switching units in accordance with a down sampling phase of the inputted signal or a down sampling phase of the equalized signal of one adaptive equalizing unit.

Aspect 10: The adaptive equalizer according to aspect 9, characterized in that the one or more switching units are connected to the adaptive equalizing units other than the current adaptive equalizing unit.

Aspect 11: An adaptive equalizing method applied to an adaptive equalizer, which includes an adaptive equalizing unit, for adaptively equalizing an inputted signal to output the equalized signal; a coefficient updating unit, for updating a coefficient of a filter of the adaptive equalizing unit; the adaptive equalizing method comprises: detecting a down sampling phase of the inputted signal or a down sampling phase of the equalized signal; determining whether the detected phase is within a predetermined range; and controlling update of the coefficient of the filter of the adaptive equalizing unit in accordance with the determination result.

Aspect 12: An adaptive equalizing method applied to an adaptive equalizer, which includes a plurality of adaptive equalizing units, for adaptively equalizing respective inputted signals to output the equalized signals; a plurality of coefficient updating units, corresponding to the plurality of adaptive equalizing units, for updating coefficients of filters of the corresponding adaptive equalizing units; the adaptive equalizing method includes: detecting a down sampling phase of the inputted signal or a down sampling phase of the equalized signal of one adaptive equalizing unit; and controlling update of the coefficients of the filters of adaptive equalizing units rather than the adaptive equalizing unit in accordance with the detected phase.

Aspect 13: A computer program, when executed by a computer or a logical component, or executed after having been explained or compiled, enables the computer or the logical component to carry out the functions of the adaptive equalizer according to any one of aspects 1-10.

Aspect 14: A computer program, when executed by a computer or a logical component, or executed after having been explained or compiled, enables the computer or the logical component to carry out the filter coefficient adjusting method according to any one of aspects 11-12.

Aspect 15: A storage medium stores the computer program according to aspect 13 or 14.

The advantage of the present invention rests in the realization of adaptive equalization without any clock recovery circuit, while it is more effective to extract the clock by using the output signal having been adaptively equalized.

DRAWINGS ACCOMPANYING THE DESCRIPTION

The drawings illustrate preferred embodiments of the present invention, constitute a part of the Specification, and are used together with the literal explanations to further enunciate the principles of the present invention. In the drawings.

Figure 11:
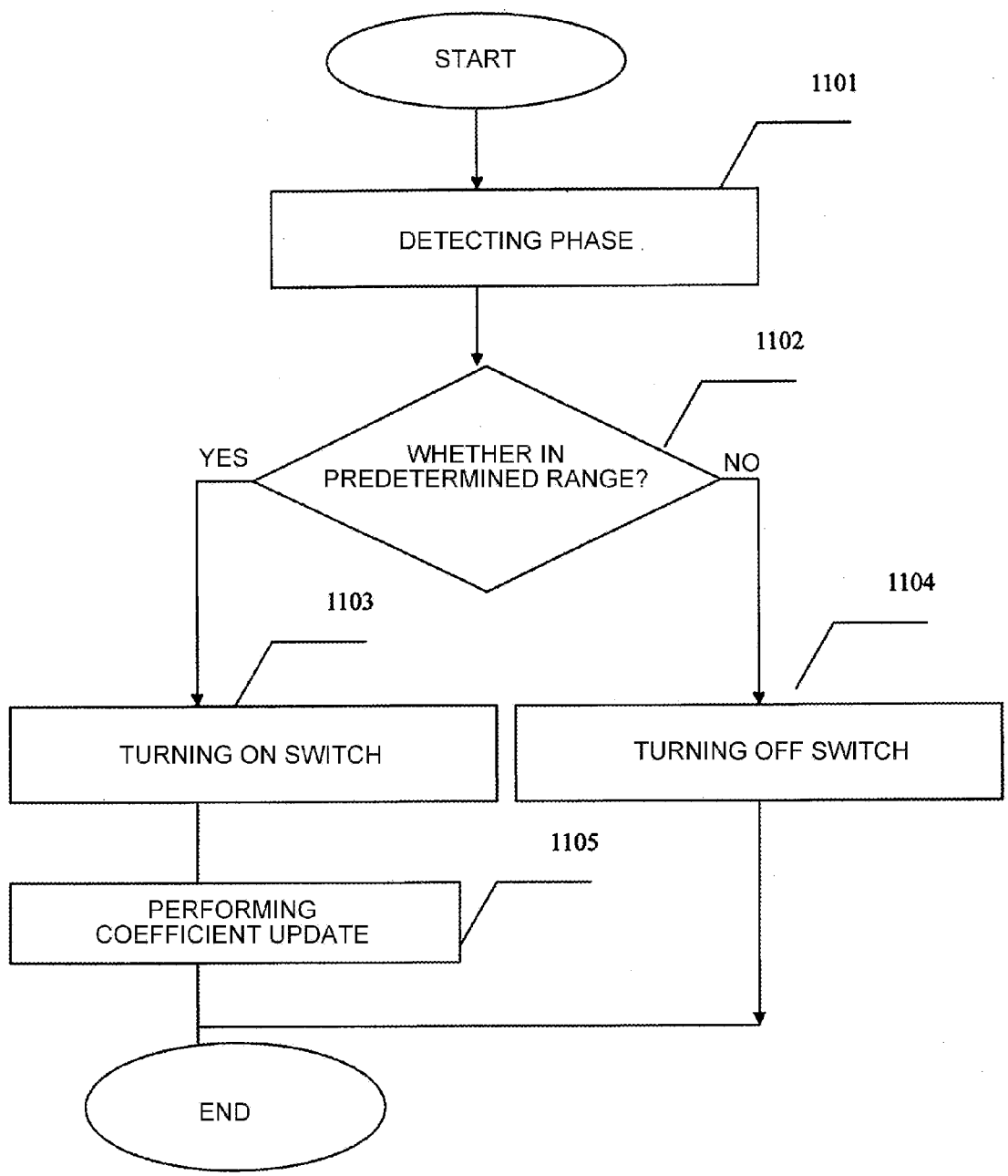

FIGS. 6-10 respectively show modes of controlling two branches of signals by the monitoring device; and FIG. 11 is a flowchart illustrating the adaptive equalizing method according to one embodiment of the present invention.

SPECIFIC EMBODIMENTS FOR CARRYING OUT THE INVENTION

The present invention is described in greater detail below with reference to the accompanying drawings.

Figure 1:
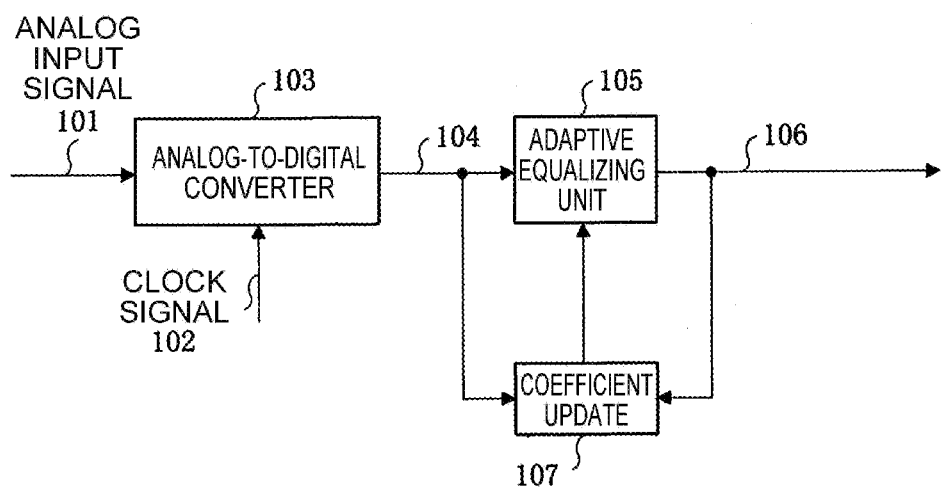
FIG. 1 is a structural block diagram showing a prior art adaptive equalizer.
Figure 2:
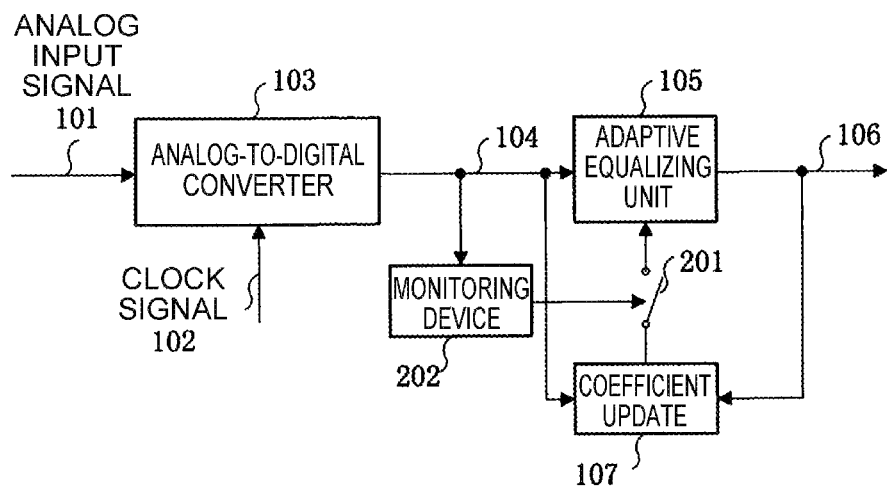
FIG. 2 is a structural block diagram schematically illustrating the adaptive equalizer according to one embodiment of the present invention.
Figure 3:
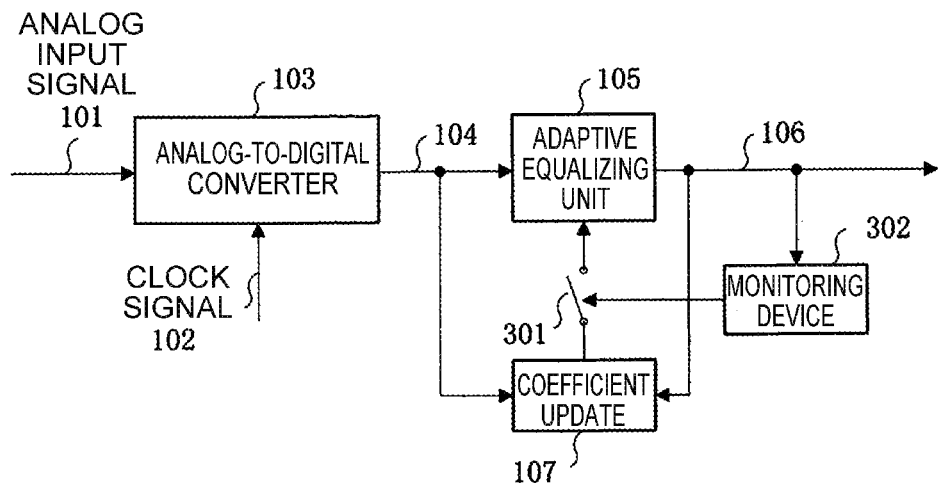
FIG. 3 is a structural block diagram schematically illustrating the adaptive equalizer according to another embodiment of the present invention.

FIG. 2 is a structural block diagram schematically illustrating the adaptive equalizer according to one embodiment of the present invention, and FIG. 3 is a structural block diagram schematically illustrating the adaptive equalizer according to another embodiment of the present invention. In comparison with prior art technology as shown in FIG. 1, a monitoring device is employed in both embodiments to control the output from the coefficient updating unit 107 to the adaptive equalizing unit 105 via a switching unit. The two embodiments differ from each other in the fact that input of the monitoring device 202 is the input digital signal 104 to the adaptive equalizing unit 105 (namely a signal not having been adaptively equalized) in the feed-forward mode of FIG. 2, whereas input of the monitoring device 302 is the digital signal 106 output from the adaptive equalizing unit 105 (namely a signal having been adaptively equalized) in the feedback mode of FIG. 3.

As can be known from FIGS. 2 and 3, the present invention differs from the prior art mainly in the addition of the monitoring device. The monitoring devices 202 and 302 will be described in further detail below.

Figure 4:
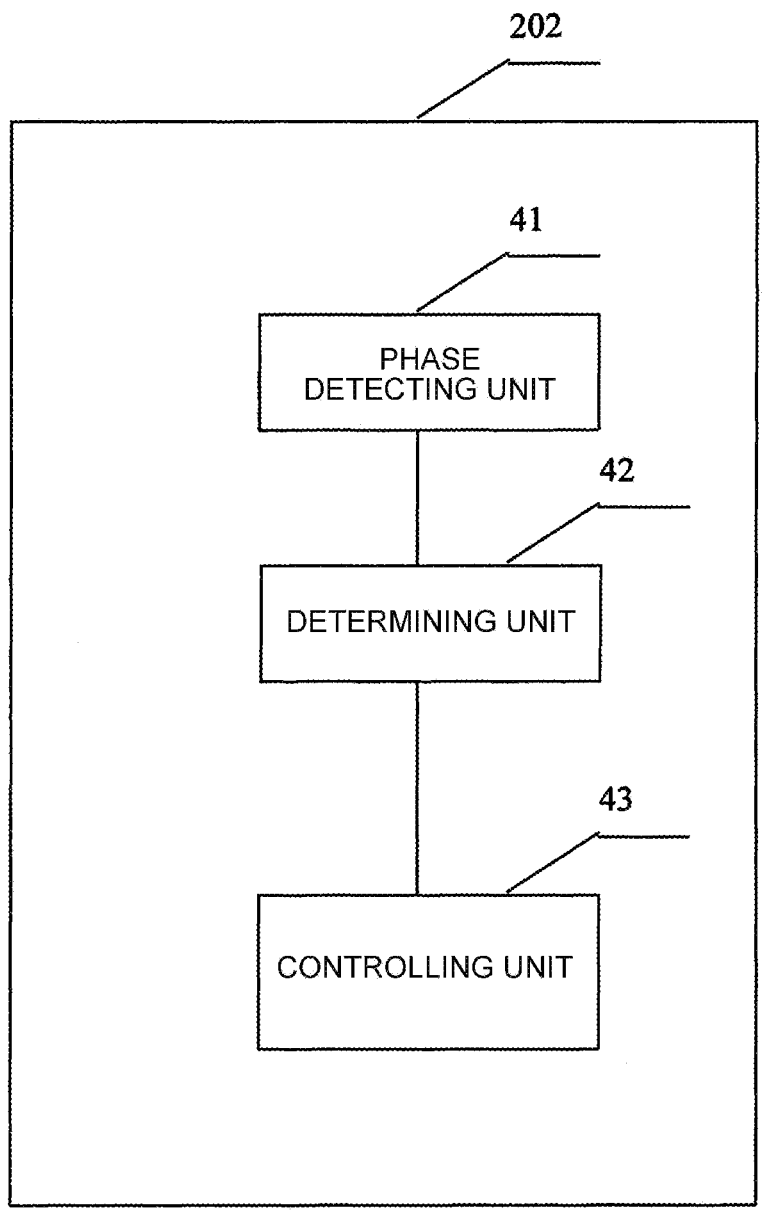
FIG. 4 is a block diagram schematically illustrating the monitoring device according to one embodiment of the present invention.

FIG. 4 is a block diagram schematically illustrating the monitoring device according to one embodiment of the present invention. As shown in FIG. 4, according to one embodiment of the present invention, the monitoring device 202 (or 302) includes a phase detecting unit 41, a determining unit 42 and a controlling unit 43, which are described in detail below by taking the monitoring device 202 for example.

Input of the monitoring device 202 is the input signal 104 to the adaptive equalizing unit 105. When the clock signal 102 is asynchronous with the analog input signal 101, sampling timing of the analog-to-digital converter 103 will vary within the symbol length. The phase detecting unit 41 of the monitoring device 202 grossly detects the sampling timing of the input signal (namely down sampling phase). Subsequently, the determining unit 42 determines whether the phase detected by the phase detecting unit 41 is within a predetermined range. The controlling unit 43 controls whether to perform coefficient update in accordance with the determination result of the determining unit 42, i.e., controls whether to input the output of the coefficient updating unit 107 into the adaptive equalizing unit 105. Specifically, when the determining unit 42 determines the phase detected by the phase detecting unit 41 to be within the predetermined range, the coefficient updating unit 107 updates the adaptive equalizing unit 105. That is to say, the controlling unit 43 controls to turn the switch 201 on to thereby input the output of the coefficient updating unit 107 into the adaptive equalizing unit 105. However, when the determining unit 42 determines the phase detected by the phase detecting unit 41 to be not within the predetermined range, the coefficient updating unit 107 does not update the adaptive equalizing unit 105. That is to say, the controlling unit 43 controls to turn the switch 201 off, so that output of the coefficient updating unit 107 is not input into the adaptive equalizing unit 105. Concept of the present invention is for the monitoring device to select those substantially synchronous sampling points for use in coefficient update of the adaptive equalizing unit (adaptive filter), to equivalently realize the synchronous clock. Substantially synchronous sampling points are sampling points of down sampling phases within a predetermined range.

The phase detecting unit 41 may employ a timing error detector of a clock recovery circuit to determine the down sampling phase. For instance, in the circumstance of using the Gardner algorithm to process double over-sampling data, the timing error e(k) can be determined by the following Equation: $e(k)=\{y[(k-1)T+\tau_{k-1}]-y(kT+\tau_k)\}y(kT-T/2+\tau_{k-1})$, where $\tau_{k-1}$ and $\tau_k$ are respectively the down sampling phases within the k−1$^{th}$ and the k$^{th}$ symbol periods, T is the symbol period, and $y[(k-1)T+\tau_{k-1}]$, $y(kT-T/2+\tau_{k-1})$, and $y(kT+\tau_k)$ indicates three consecutive sampling points.

In this context the timing error is a kind of down sampling phase indication signal used to indicate the down sampling phase. Other measurement amounts can also be employed in the present invention to indicate the down sampling phase. The signal indicative of the down sampling phase is called the down sampling phase indication signal, and also referred to as e(k) in the following paragraphs.

The timing error signal used in common clock recovery circuits can serve as the timing error signal in the present invention. These common clock recovery circuits include, for example, early-late detector (ELD), zero-crossing detector (ZCD), Mueller and Mueller detector (MMD), Gardner detector (GAD), Oerder and Meyr estimator (O&M), and so on. [Umberto Mengali and Aldo N. D'Andrea, Synchronization Techniques for Digital Receivers].

As should be noted, other measurement amounts can also be employed to perform down sampling phase detection, as long as these measurement amounts can indicate the input down sampling phases of the signals. For example, input power of the sampling points can be used.

Still taking the circumstance of calculating the timing error as the down sampling phase for example, operations of the phase detecting unit 41, the determining unit 42 and the controlling unit 43 are described below.

Suppose the sampling rate of an input sampling signal equals N times the symbol rate (where N is an integer greater than or equal to 1).

In one embodiment of the present invention, the phase detecting unit 41 calculates the timing error e(k) at an interval of N samples, the determining unit 42 determines whether e(k) is greater than a predetermined threshold value, and the controlling unit, 43 controls the off and on of the switch 201 in accordance with the determination result of the determining unit 42. For instance, if the timing error e(k) is greater than a predetermined positive threshold value, the switch 201 is turned on and the coefficient is updated; otherwise, the switch 201 is turned off and no update of the coefficient is performed. Alternatively, if the timing error e(k) is less than a predetermined negative threshold value, the switch 201 is turned on and the coefficient is updated; otherwise, the switch 201 is turned off and no update of the coefficient is performed.

It is defined in another embodiment of the present invention with respect to the k$^{th}$ sample (where k is an integer greater than or equal to 1) that $$k_- = k - \left\lfloor \frac{N}{2} \right\rfloor, \text{ and } k_+ = k + \left\lceil \frac{N}{2} \right\rceil,$$

where $\lfloor \ \rfloor$ indicates rounding downwards and $\lceil \ \rceil$ indicates rounding upwards. The phase detecting unit 41 calculates $e(k_-)$, $e(k)$ and $e(k_+)$, the determining unit 42 determines whether the following conditions are concurrently satisfied in accordance with a predetermined positive threshold value thres:

$e(k_-)\leftarrow$thres, $e(k)$>thres, and $e(k_+)\leftarrow$thres, and the controlling unit 43 controls the off and on of the switch 201 in accordance with the determination result of the determining unit 42, i.e. to turn the switch 201 on when the conditions are satisfied, and to turn the switch 201 off when the conditions are not satisfied.

Alternatively, the determining unit 42 can determine whether the following conditions are concurrently satisfied:

$e(k_-)$>thres, $e(k)\leftarrow$thres, and $e(k_+)$>thres, and the controlling unit 43 controls the off and on of the switch 201 in accordance with the determination result of the determining unit 42, i.e. to turn the switch 201 on when the conditions are satisfied, and to turn the switch 201 off when the conditions are not satisfied.

In addition, $k_-$ and $k_+$ can also be defined as $$k_- = k - \left\lceil \frac{N}{2} \right\rceil, \quad k_+ = k + \left\lfloor \frac{N}{2} \right\rfloor.$$

As should be noted, in addition to the two determining methods as discussed above, other modes capable of determining the down sampling phase of an input signal to be within a predetermined range can also be employed in the present invention.

The working principle of the monitoring device 302 is the same as the working principle of the monitoring device 202, and the two devices differ in the input of 302 being an adaptively equalized output signal 106.

Figure 5:
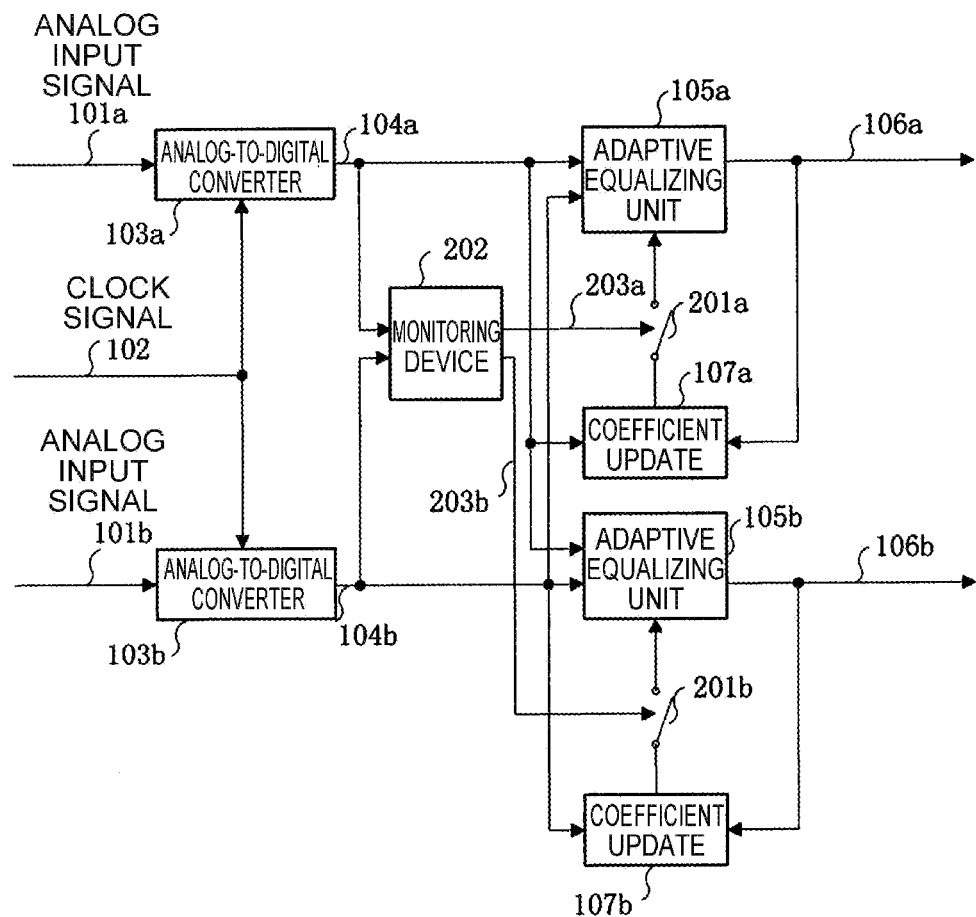
FIG. 5 is a structural block diagram illustrating an adaptive equalizer for use in a two-dimensional feed-forward controlled polarization multiplexing coherent receiver according to one embodiment of the present invention.

The above control can also be applied in multidimensional signal processing. FIG. 5 is a structural block diagram illustrating an adaptive equalizer for use in a two-dimensional feed-forward controlled polarization multiplexing coherent receiver according to one embodiment of the present invention.

As shown in FIG. 5, the analog input signal 101a passes through the analog-to-digital converter 103a controlled by the clock signal 102 to become a quantized digital signal 104a (which is for example an H branch signal of a polarization multiplexing coherent receiver) for subsequent equalizing process. The coefficient updating unit 107a obtains an updated equalizer coefficient in accordance with the input digital signal 104a and an output signal 106a of the equalizer, and inputs the coefficient to the adaptive equalizing unit 105a to make possible real-time tracking of changes in the system. The monitoring device 202 controls the switch 201a connected between the coefficient updating unit 107a and the adaptive equalizing unit 105a to thereby control coefficient update of the adaptive equalizing unit 105a.

On the other hand, the analog input signal 101b passes through the analog-to-digital converter 103b controlled by the clock signal 102 to become a quantized digital signal 104b (which is for example a V branch signal of the polarization multiplexing coherent receiver) for subsequent equalizing process. The coefficient updating unit 107b obtains an updated equalizer coefficient in accordance with the input digital signal 104b and an output signal 106b of the equalizer, and inputs the coefficient to the adaptive equalizing unit 105b to make possible real-time tracking of changes in the system. The monitoring device 202 controls the switch 201b connected between the coefficient updating unit 107b and the adaptive equalizing unit 105b to thereby control coefficient update of the adaptive equalizing unit 105b.

The monitoring device 202 may employ any one of the controlling modes as shown in FIGS. 6-10 to control the switches 201a and 201b. FIGS. 6-10 respectively show modes for controlling two branches of signals by the monitoring device.

Figure 6:
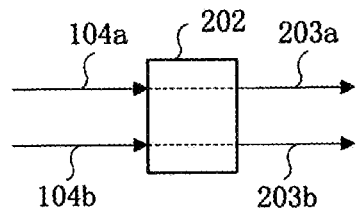

With the controlling mode shown in FIG. 6, the monitoring device controls the output signal 203a in accordance with the down sampling phase of the input signal 104a, and controls the output signal 203b in accordance with the down sampling phase of the input signal 104b.

That is to say, the phase detecting unit 41 detects the down sampling phase of the input signal 104a. Subsequently, the determining unit 42 determines whether the down sampling phase of the input signal 104a detected by the phase detecting unit 41 is within a predetermined range. The controlling unit 43 controls whether to perform coefficient update of the adaptive equalizing unit 105a in accordance with the determination result of the determining unit 42, i.e., controls whether to input the output of the coefficient updating unit 107a into the adaptive equalizing unit 105a.

Meanwhile, the phase detecting unit 41 detects the down sampling phase of the input signal 104b. Subsequently, the determining unit 42 determines whether the down sampling phase of the input signal 104b detected by the phase detecting unit 41 is within a predetermined range. The controlling unit 43 controls whether to perform coefficient update of the adaptive equalizing unit 105b in accordance with the determination result of the determining unit 42, i.e., controls whether to input the output of the coefficient updating unit 107b into the adaptive equalizing unit 105b.

Figure 7:
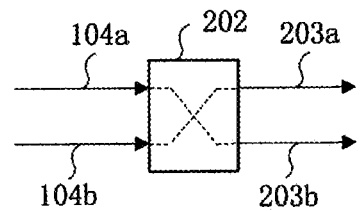

With the controlling mode shown in FIG. 7, the monitoring device controls the output signal 203b in accordance with the down sampling phase of the input signal 104a, and controls the output signal 203a in accordance with the down sampling phase of the input signal 104b.

That is to say, the phase detecting unit 41 detects the down sampling phase of the input signal 104a. Subsequently, the determining unit 42 determines whether the down sampling phase of the input signal 104a detected by the phase detecting unit 41 is within a predetermined range. The controlling unit 43 controls whether to perform coefficient update of the adaptive equalizing unit 105b in accordance with the determination result of the determining unit 42, i.e., controls whether to input the output of the coefficient updating unit 107b into the adaptive equalizing unit 105b.

Meanwhile, the phase detecting unit 41 detects the down sampling phase of the input signal 104b. Subsequently, the determining unit 42 determines whether the down sampling phase of the input signal 104b detected by the phase detecting unit 41 is within a predetermined range. The controlling unit 43 controls whether to perform coefficient update of the adaptive equalizing unit 105a in accordance with the determination result of the determining unit 42, i.e., controls whether to input the output of the coefficient updating unit 107a into the adaptive equalizing unit 105a.

Figure 8:
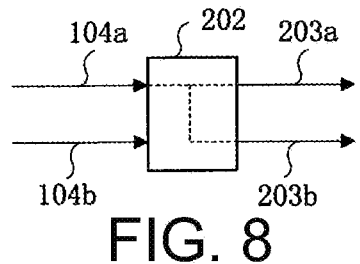

With the controlling mode shown in FIG. 8, the monitoring device controls both the output signal 203a and the output signal 203b in accordance with the down sampling phase of the input signal 104a.

That is to say, the phase detecting unit 41 detects the down sampling phase of the input signal 104a. Subsequently, the determining unit 42 determines whether the down sampling phase of the input signal 104a detected by the phase detecting unit 41 is within a predetermined range. The controlling unit 43 controls whether to perform coefficient update of both the adaptive equalizing unit 105a and the adaptive equalizing unit 105b in accordance with the determination result of the determining unit 42.

Figure 9:
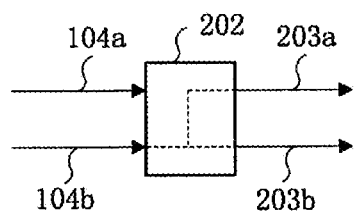
Figure 10:
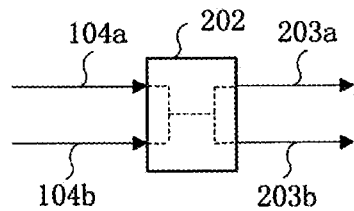

By the same principle, with the controlling mode shown in FIG. 9, the monitoring device controls both the output signal 203a and the output signal 203b in accordance with the down sampling phase of the input signal 104b.

In addition, under certain circumstances, down sampling phase indication is obtained from two-dimensional input signals 104a and 104b. For instance, the total input power is obtained (by calculating the sum of moduli of two branches of signals) to collectively control the outputs 203a and 203b in accordance with the fact whether the total input power is within a predetermined range.

For example, if the input signal 104a is $x_a(k)$, and the input signal 104b is $x_b(k)$, the down sampling phase indication signal will be $e(k)=|x_a(k)+x_b(k)|^2$.

By comparing the phase indication signal with a predetermined threshold value, it is possible to determine whether it is within the predetermined range to thereby perform control accordingly.

Description of the above circumstance of generating two branches of output signals is merely exemplary in nature, as the present invention is entirely capable of aiming at circumstances of generating three or more branches of output signals. Under such circumstances, update of filter coefficients of respective adaptive equalizing units can be controlled by detecting the phases of the input signals of the respective adaptive equalizing units and determining whether these phases fall within a predetermined range. Moreover, it is also possible under such circumstances to control update of filter coefficients of two, or more adaptive equalizing units by determining whether the phase of the input signal of one adaptive equalizing unit is within the predetermined range.

FIG. 11 is a flowchart schematically illustrating the adaptive equalizing method according to one embodiment of the present invention. As shown in FIG. 11, phase detection is firstly performed in Step 1101, i.e. the down sampling phase of the input signal 104 or the adaptively equalized signal 106 is detected. This can be done for instance by detecting the timing error or power of these signals. It is then determined in Step 1102 whether the detected phase is within a predetermined range. This can be done for instance by comparing with a predetermined threshold value. If it is determined that the detected phase is within the predetermined range (YES in Step 1102), the switch 201 connected between the coefficient updating unit 107 and the adaptive equalizing unit 105 is turned on in Step 1103, to thereby update the filter coefficient in the adaptive equalizing unit 105 in Step 1105. On the other hand, if it is determined that the detected phase is not within the predetermined range (NO in Step 1102), the switch 201 connected between the coefficient updating unit 107 and the adaptive equalizing unit 105 is turned off in Step 1104, so that no update is performed on the filter coefficient in the adaptive equalizing unit 105.

In the case there are plurality of adaptive equalizing units 105 and coefficient updating units 107, update of their filter coefficients can be carried out with the modes illustrated above in FIGS. 6-10. It is not only possible to control update of the filter coefficient of one adaptive equalizing unit 105 in accordance with the down sampling phase of the input signal or of the output signal of this adaptive equalizing unit 105 itself, but also possible to control update of the filter coefficients of one or more adaptive equalizing units 105 in accordance with the down sampling phase of the input signal or of the output signal of another adaptive equalizing unit 105.

Steps 1101 and 1102 correspond to the detecting step in the present invention, and steps 1104 and 1105 correspond to the controlling step in the present invention.

The present invention can be realized by pure hardware, but can also be realized by pure software, and can be further realized by combination of hardware with software. When the present invention is realized by software, while being executed by a computer and the like, the software enables the computer and the like to implement the aforementioned methods or apparatuses. The present invention further relates to a storage medium storing the software. The storage medium can for instance be a CD, a DVD, a floppy disk, an MO, a flash memory, and a magnetic tape, etc.

Although preferred embodiments are merely selected above to exemplify the present invention, it is easy for a person skilled in the art, according to the contents herein disclosed, to make various variations and modifications without departing from the inventive scope as defined in the attached claims. Description of the embodiments is merely exemplary of rather than restrictive to the inventions as defined in the attached claims and by analogues thereof.

What is claimed is:

1. An adaptive equalizer, comprising:
   an adaptive equalizing unit, for adaptively equalizing an inputted signal to output the equalized signal;
   a coefficient updating unit, for updating a coefficient of a filter of the adaptive equalizing unit;
   a switching unit, connected between the coefficient updating unit and the adaptive equalizing unit, wherein when the switching unit is on, the coefficient updating unit is capable of updating the coefficient of the adaptive equalizing unit, and when the switching unit is off, the coefficient updating unit is incapable of updating the coefficient of the adaptive equalizing unit; and
   a monitoring device, for controlling on or off of the switching unit in accordance with a down sampling phase of the inputted signal or a down sampling phase of the equalized signal,
   wherein the monitoring device comprises:
   a phase detecting unit, for detecting the down sampling phase of the inputted signal or the down sampling phase of the equalized signal;
   a determining unit, for determining whether the down sampling phase detected by the phase detecting unit is within a predetermined range; and
   a controlling unit, for controlling on and off of the switching unit in accordance with the determination result of the determining unit.

2. The adaptive equalizer according to claim 1, characterized in that the phase detecting unit calculates the down sampling phase of the inputted signal or the down sampling phase of the equalized signal at an interval of N samples, and the determining unit determines whether the phase is within a predetermined range, wherein N is a positive integer greater than or equal to 1.

3. The adaptive equalizer according to claim 1, characterized in that the phase detecting unit calculates, with respect to the inputted signal of the current sample or the equalized signal of the current sample, the down sampling phase of the inputted signal or the down sampling phase of the equalized signal of the current sample as well as the down sampling phase of the inputted signal or the down sampling phase of the equalized signal of the previous sample and the next sample which are spaced by a half symbol period from the current sample, and the determining unit determines whether the down sampling phase of the inputted signal or the equalized signal of the current sample is within the predetermined range in accordance with the down sampling phase of the inputted signal or the equalized signal of the current sample and the down sampling phase of the inputted signal or the equalized signal of the previous sample and the next sample which are spaced by a half symbol period from the current sample.

4. The adaptive equalizer according to claim 3, characterized in that
   with respect to a predetermined positive threshold value thres, the determining unit determines whether the following conditions are concurrently satisfied:
   $e(k_-) < -thres$,
   $e(k) > thres$, and
   $e(k_+) < -thres$,
   if the above conditions are concurrently satisfied, the determining unit determines that the down sampling phase of the inputted signal or the down sampling phase of the equalized signal of the current sample is within the predetermined range, where $e(k_-)$ indicates the down sampling phase of the inputted signal or the down sampling phase of the equalized signal of the previous sample spaced by a half symbol period from the current sample, $e(k)$ indicates the down sampling phase of the inputted signal or the down sampling phase of the equalized signal of the current sample, and $e(k_+)$ indicates the down sampling phase of the inputted signal or the down sampling phase of the equalized signal of the next sample spaced by a half symbol period from the current sample.

5. The adaptive equalizer according to claim 3, characterized in that with respect to a predetermined positive threshold value thres, the determining unit determines whether the following conditions are concurrently satisfied:

$e(k_-) > thres$, $e(k) < thres$, and $e(k_+) > thres$, if the above conditions are concurrently satisfied, the determining unit determines that the down sampling phase of the inputted signal or the down sampling phase of the equalized signal of the current sample is within the predetermined range, where $e(k_-)$ indicates the down sampling phase of the inputted signal or the down sampling phase of the equalized signal of the previous sample spaced by a half symbol period from the current sample, $e(k)$ indicates the down sampling phase of the inputted signal or the down sampling phase of the equalized signal of the current sample, and $e(k_+)$ indicates the down sampling phase of the inputted signal or the down sampling phase of the equalized signal of the next sample spaced by a half symbol period from the current sample.

6. The adaptive equalizer according to claim 1, characterized in that the down sampling phase of the inputted signal or the down sampling phase of the equalized signal is indicated by a timing error or power of the inputted signal or the equalized signal.

7. The adaptive equalizer according to claim 1, characterized in further comprising:

one or more other adaptive equalizing units, for adaptively equalizing respective inputted signals to output the equalized signals;

one or more other coefficient updating units, corresponding to the one or more other adaptive equalizing units on a one-by-one basis, for updating coefficients of filters of the corresponding other adaptive equalizing units;

one or more other switching units, respectively connected between the other coefficient updating units and the other adaptive equalizing units corresponding to the other coefficient updating units, wherein when the switching units are on, the other coefficient updating units are capable of updating the coefficients of filters of the adaptive equalizing units, and when the switching units are off, the other coefficient updating units are incapable of updating the coefficients of filters of the adaptive equalizing units;

the monitoring device controls update of the coefficients of the filters of the other adaptive equalizing units besides the adaptive equalizing unit in further accordance with the down sampling phase of the inputted signal of the adaptive equalizing unit or the down sampling phase of the equalized signal of the adaptive equalizing unit.

8. An adaptive equalizing method applied to an adaptive equalizer, which comprises:

an adaptive equalizing unit, for adaptively equalizing an inputted signal to output the equalized signal;

a coefficient updating unit, for updating a coefficient of a filter of the adaptive equalizing unit;

the adaptive equalizing method comprising:

a phase detecting step, for detecting a down sampling phase of the inputted signal or a down sampling phase of the equalized signal;

a determining step, for determining whether the phase detected by the phase detecting step is within a predetermined range; and a controlling step, for controlling update of the coefficient of the filters of the adaptive equalizing unit in accordance with the determination result of the determining step.

9. An adaptive equalizing method applied to an adaptive equalizer, which comprises:

a plurality of adaptive equalizing units, for adaptively equalizing respective inputted signals to output the equalized signals;

a plurality of coefficient updating units, corresponding to the plurality of adaptive equalizing units, for updating coefficients of filters of the corresponding adaptive equalizing units;

the adaptive equalizing method comprising:

detecting a down sampling phase of the inputted signal or a down sampling phase of the equalized signal of one adaptive equalizing unit; and controlling to update the coefficients of the filters of the one or more adaptive equalizing units when the phase detected by the detecting is within a predetermined range.

* * * * *